United States Patent [19]
Nakazawa et al.

[11] Patent Number: 5,737,099
[45] Date of Patent: Apr. 7, 1998

[54] FILM IMAGE INPUT SYSTEM HAVING IMPROVED FOCUSING AND REDUCED SIZE

[75] Inventors: Makoto Nakazawa; Masaaki Orimoto, both of Asaka, Japan

[73] Assignee: Fuji Photo Film Co., Ltd., Kanagawa, Japan

[21] Appl. No.: 788,203

[22] Filed: Jan. 24, 1997

Related U.S. Application Data

[63] Continuation of Ser. No. 385,166, Feb. 7, 1995, abandoned.

[30] Foreign Application Priority Data

Feb. 7, 1994 [JP] Japan .................. 6-013661

[51] Int. Cl.⁶ ........................................ H04N 1/04
[52] U.S. Cl. ................................ 358/487; 358/498
[58] Field of Search ............................ 358/487, 474, 358/471, 498, 496, 506, 509, 505, 475; 355/71, 67, 75, 50, 63; 362/268, 298

[56] References Cited

U.S. PATENT DOCUMENTS

| | | | |
|---|---|---|---|
| 3,988,537 | 10/1976 | Cooley | 178/7.6 |
| 4,023,903 | 5/1977 | Scheib | 355/71 |
| 4,710,818 | 12/1987 | Inatsuki | 358/214 |
| 4,716,470 | 12/1987 | Levin | 358/400 |
| 4,931,863 | 6/1990 | Tokuda | 358/78 |
| 5,036,402 | 7/1991 | Shiota | 358/244 |
| 5,045,932 | 9/1991 | Sharman et al. | 358/527 |
| 5,245,418 | 9/1993 | Gilmour et al. | 358/527 |
| 5,295,204 | 3/1994 | Parulski | 382/63 |
| 5,438,434 | 8/1995 | Saitoh | 358/487 |
| 5,625,468 | 4/1997 | Oosaka | 358/487 |
| 5,633,733 | 5/1997 | Miyazawa | 358/487 |
| 5,646,747 | 7/1997 | Watanabe et al. | 358/487 |

FOREIGN PATENT DOCUMENTS

| | | |
|---|---|---|
| 5 22656 | 1/1993 | Japan . |
| 5 56345 | 3/1993 | Japan . |
| 5 75922 | 3/1993 | Japan . |
| WO 9004301 | 4/1990 | WIPO . |

*Primary Examiner*—Edward L. Coles, Sr.
*Assistant Examiner*—Fan Lee

[57] ABSTRACT

When illuminating light from a fluorescent light is illuminated toward photo film being conveyed, the transmitted image light of the illuminated photo film is reflected by a mirror and focused on a CCD line sensor through a taking lens. Then, the electric signals converted by photoelectric conversion elements of the CCD line sensor are image-processed by an image processing system, and then outputted to a TV monitor as image signals. The fluorescent light is arranged on the side of the base surface of the film such that the illuminating light illuminates the base surface of the film first and then passes through the emulsion surface of the film so that this image light is focused on the CCD line sensor, so that the film image can be reproduced clearly. The taking lens and the CCD line sensor are arranged in a space between the film cartridge and the film winding room in such a manner that the taking optical axis becomes parallel to the photo film conveying direction so as to use the space effectively, so that the system can be made compact.

10 Claims, 2 Drawing Sheets

FILM IMAGE INPUT SYSTEM HAVING IMPROVED FOCUSING AND REDUCED SIZE

This application is a continuation of application Ser. No. 08/385,166 filed on Feb. 7, 1995, now abandoned.

BACKGROUND OF THE INVENTION

1. Field of the Invention

The present invention relates to a film image input system, more particularly to a film image input system wherein a film image of a developed photo film is illuminated by a light source, the transmitted image light is focused on an image sensor through a taking lens and image signals, which are transferred photoelectrically by the image sensor, are output to a TV monitor and the like.

2. Description of the Related Art

A film image input system is known, in which a developed photo film being conveyed is applied with the illuminating light from the light source, the transmitted image light of the illuminated photo film is focused by an image sensor such as a CCD so as to be outputted to the TV monitor and the film image is displayed, in WO90/04301, Japan Patent Application Laid-Open No. 5-75922, Japan Patent Application Laid-Open No. 5-56345, Japan Patent Application Laid-Open No. 5-22656 and the like.

However, the conventional film image input system has a disadvantage in that reproduced film images are out of focus.

And, in the conventional film image input system, the optical axes of the taking lens and the image sensor are arranged perpendicular to the photo film surface, therefore, there is another disadvantage in that the system becomes long in the taking optical axis, that is, becomes large-sized.

SUMMARY OF THE INVENTION

The present invention has been developed to eliminate the above-described disadvantages and has as its aim the provision of a compact film image input system wherein the film image can be reproduced clearly.

To achieve the above-described object, a film image input system comprising: a film supplier for sending out a long roll of a developed photo graphic film wound in a film cartridge from said film cartridge; a winder for winding said film sent by said film supplier; a light source for illuminating said film from a side of a base surface of said film between said film supplier and said winder and, an image sensor arranged in an opposite side of said light source across said film and focused with a transmitted image light of said film illuminated by said light source through a taking lens and outputting image signals.

The out of focus reproduced film image is caused by the emulsion surface of the photo film which is illuminated by the illuminating light of the light source in the conventional film image input system. That is, when the illuminating light illuminates the emulsion surface, the transmitted image light of the film image taken in the emulsion surface diffuses while passing through the base of the photo film. It is confirmed that this diffusion causes the out of focus film image.

Therefore, according to this invention, the light source is arranged in the side of the base surface of the photo film and the illuminating light illuminates toward the base surface, and the transmitted image light is focused on the image sensor without passing through the base, so that the film image can be reproduced clearly.

And, according to this invention, the transmitted image light of the film is reflected almost parallel to the film supply direction by the mirror arranged in the space between the film cartridge and the winding room, and the reflected-transmitted image light is focused on the image sensor through the taking lens.

That is, according to the present invention, the taking lens and the image sensor are arranged in the space between the film cartridge and the winding room to use the space effectively, so that the system can be made compact.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof and wherein.

DESCRIPTION OF THE PREFERRED EMBODIMENT

A detailed description will hereafter be given of the preferred embodiment of a film image input system according to the present invention with reference to the accompanying drawings.

Figure 1:
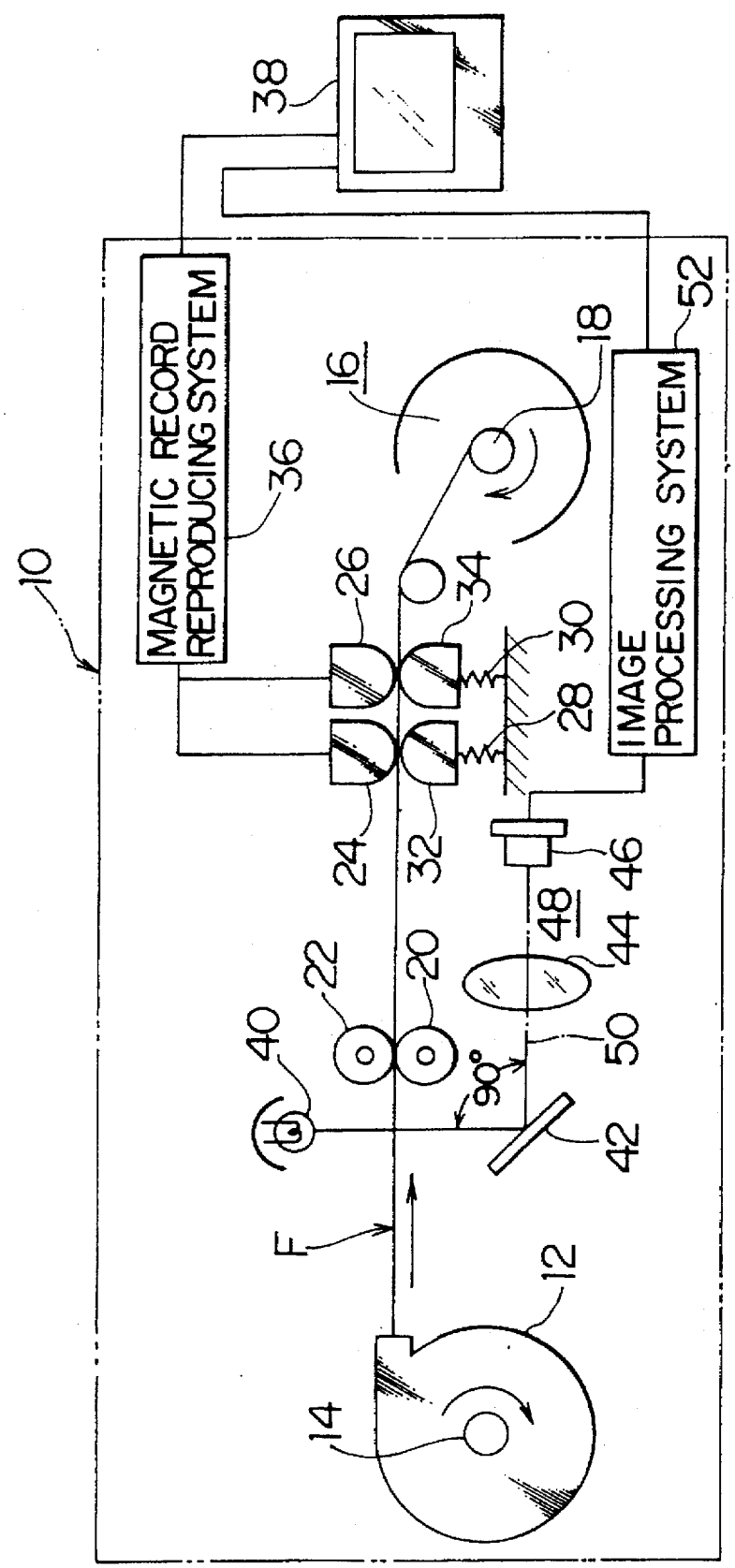
FIG. 1 is a structural view showing an embodiment of a film image input system according to the present invention.

FIG. 1 is a structural view of a film image input system according to the present invention.

A film cartridge 12 is fitted in a main body of the film image input system, surrounded by a two-dot chain line in FIG. 1. In the film cartridge 12, a developed photo film F is previously wound round a spool 14. The photo film F is conveyed by a film driving mechanism in the direction of an arrow in FIG. 1 while the emulsion surface faces to the bottom.

The film driving mechanism includes a film supplying part, which is engaged with the spool 14 in the film cartridge 12, for rotating the spool 14 clockwise/counterclockwise, a film winding part, which is engaged with a winding spool 18 in a film winding room 16, for winding the photo film F conveyed from the film supplying part and a film conveying part, which is located in the conveyance path of the photo film F, for conveying the photo film by holding the photo film F with a capstan 20 and a pinchroller 22 at a constant speed.

In the film supplying part, the spool 14 of the film cartridge 12 is driven clockwise in FIG. 1 and the photo film F is sent out until the head of the photo film is wound by the winding spool 18 in the film winding part. And, the film supplying part is provided with a clutch mechanism for controlling the rotation of the spool, and the photo film F is conveyed with a predetermined tension by the action of the clutch mechanism and the driving power of the capstan 20.

In the conveyance path of the photo film F, a magnetic head 24 for reproducing and a magnetic head 26 for recording are arranged close to each other. Magnetic record layers, not shown, formed on the photo film are pushed to the magnetic heads 24, 26 by pads 32, 34 forced with springs 28, 30. With this arrangement, the magnetic data recorded in the magnetic record layers are read by the magnetic head 24 for reproducing, and then the read magnetic data are reproduced by a magnetic record reproducing system 36 so as to be displayed on a TV monitor 38. Further, the magnetic data are recorded in the magnetic record layer by the magnetic head 26 for recording, which is controlled by the magnetic record reproducing system 36.

On the other hand, a fluorescent light 40 as a light source is placed above the photo film being conveyed (the side of the base of the photo film F). The illuminating light from the fluorescent light 40 illuminates the photo film F and the transmitted image light of the illuminated photo film is reflected forward in the photo film conveying direction at an angle of 90° by a mirror 42. The transmitted image light, which is reflected by the mirror 42, is focused on a CCD line sensor 46 through a taking lens 44.

The taking lens 44 and the CCD line sensor 46 are arranged below the photo film F being conveyed (the side of the emulsion surface) in FIG. 1 and in a space 48 between the film cartridge 12 and the film winding room 16. The taking lens 44 and the CCD line sensor 46 are arranged in a manner that the optical axis 50 thereof is parallel to the conveying direction of the photo film F.

According to the above film image input system, when the illuminating light is illuminated toward the photo film F being conveyed from the fluorescent light 40, the transmitted image light of the illuminated photo film F is reflected by the mirror 42 and focused on the CCD line sensor 46 through the taking lens 44. And, the electric signals, which are converted by the photoelectric conversion elements of the CCD line sensor 46, are image-processed by the image processing system 52, and then outputted to the TV monitor 38 as the image signals. As a result, the film image is displayed on the TV monitor 38.

Figure 3:
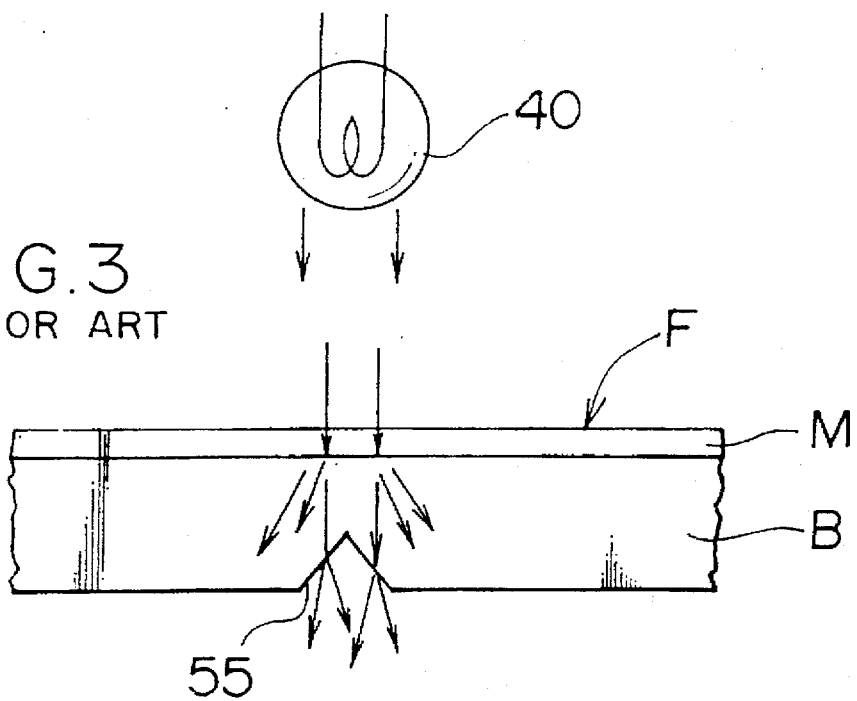

Now, As shown in FIG. 3, when the illuminating light from the fluorescent light 40 is illuminated to the emulsion surface M of the photo film F, the transmitted image light of the film image taken on the emulsion surface M diffuses while passing through the base B of the photo film F, so that the film image can be reproduced out of focus. And, when there is a chip 55 on the surface of the base B, the chip 55 stands out during the reproducing.

Figure 2:
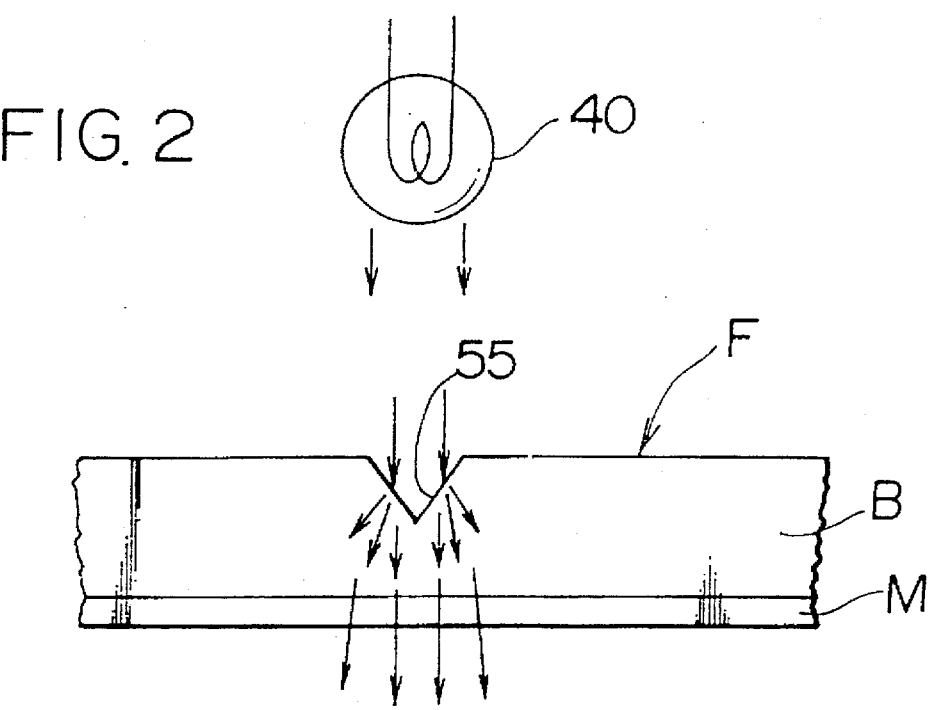
FIG. 2 is an explanatory view showing a positional relation between a fluorescent light and a photo film; and, FIG. 3 is an explanatory view showing the conventional positional relation between a fluorescent light and a photo film.

However, in this embodiment as illustrated in FIG. 2, the fluorescent light 40 is arranged in the side of the base B of the photo film F and the illuminating light is illuminated from the base B and the transmitted image light taken in the emulsion surface M is focused on the CCD line sensor 46 without passing through the base B, therefore, the film image can be reproduced clearly. And, though the surface of the base B is damaged with the chip 55, the illuminating light which entered from the chip 55 diffuses while passing through the base B and the chip 55 blurts, so that the chip 55 does not stand up.

Further, in this embodiment, as shown in FIG. 1, the taking lens 44 and the CCD line sensor are arranged in the space 48 between the film cartridge 12 and the film winding room 16 in such a manner that the taking optical axis 50 thereof are almost parallel to the photo film conveying direction, and the transmitted image light is reflected toward the taking lens 44 by the mirror 42.

That is, according to this embodiment, the taking lens 44 and the image sensor 46 are arranged in the space 48, and the space 48 is used effectively, so that the system can be made compact (thin) compared with the conventional system wherein the taking optical axis of the taking lens and the image sensor are arranged perpendicular to the photo film surface.

As described above, according to the film image input system of the present invention, the light source is placed at the base surface of the photo film and the illuminating light is illuminated from the side of the base, and the transmitted image light is focused on the image sensor without passing through the base, so that the film image can be reproduced clearly.

Further, according to the film image input system of the present invention, the transmitted image light is reflected by the mirror almost parallel to the photo film conveying direction, and the reflected-transmitted image light is focused on the image sensor through the taking lens arranged in the space between the film cartridge and the winding room, so that the system can be made compact.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A film image input system comprising:

film supply means for conveying a roll of developed photographic film wound in a film cartridge out of said film cartridge;

winding means for winding said developed photographic film conveyed out of said film cartridge by said film supply means;

a light source for illuminating said developed photographic film with illumination light;

a mirror for reflecting the illumination light which has passed through said developed photographic film; and an image sensor for receiving through a taking lens the illumination light reflected by said mirror and for outputting image signals in accordance with the received illumination light, said mirror, said taking lens and said image sensor being arranged in a space between said film supply means and said winding means and being separated away from said developed photographic film, in a direction perpendicular to a conveying direction of said developed photographic film, by a distance not greater than a diameter of said film supply means and said winding means.

2. The film image input system of claim 1, wherein said mirror reflects the illumination light which has passed through said developed photographic film substantially parallel to the conveying direction.

3. A film image input system comprising:

film supply means for conveying a roll of developed film wound in a film cartridge out of said film cartridge, said developed film having a base with an emulsion surface thereon;

winding means for winding said developed film conveyed out of said film cartridge by said film supply means;

a light source for illuminating said developed film between said film supply means and said winding means with illumination light so that the illumination light passes sequentially through said base first and then through said emulsion surface;

a mirror for reflecting the illumination light which has passed through said emulsion surface; and an image sensor for receiving through a taking lens the illumination light reflected by said mirror and for outputting image signals in accordance with the received illumination light, said mirror, said taking lens and said image sensor being arranged in a space between said film supply means and said winding means and being separated away from said developed film, in a direction perpendicular to a conveying direction of said developed film, by a distance not greater than a diameter of said film supply means and said winding means.

4. The film image input system of claim 3, wherein said mirror reflects the illumination light which has passed through said emulsion surface substantially parallel to the conveying direction.

5. A method of imaging developed film, the developed film having a base with an emulsion surface thereon and being wound in a film cartridge, the method of imaging comprising the steps of:

(a) conveying a roll of the developed film out of the film cartridge;

(b) winding the developed film conveyed out of the film cartridge in said step (b) into a film winding housing;

(c) illuminating the developed film between the film cartridge and the film winding housing with illumination light so that the illumination light passes sequentially through the base first and then through the emulsion surface;

(d) focusing the illumination light, which has passed through the emulsion surface of the developed film and which has been reflected by a mirror, through a taking lens onto an image sensor and providing image signals in accordance with the focused illumination light; and (e) arranging the mirror, the taking lens and the image sensor between the film cartridge and the film winding housing and separated away from the developed film, in a direction perpendicular to a conveying direction of the developed film, by a distance not greater than a diameter of the film cartridge and the film winding housing.

6. The method of imaging developed film of claim 5, wherein said step (d) of focusing comprises reflecting the illumination light which has passed through the emulsion surface substantially parallel to the conveying direction.

7. A method of imaging developed film, the developed film being wound in a film cartridge, the method of imaging comprising the steps of:

(a) conveying a roll of the developed film out of the film cartridge;

(b) winding the developed film conveyed out of the film cartridge in said step (b) into a film winding housing;

(c) illuminating the developed film between the film cartridge and the film winding housing with illumination light;

(d) reflecting the illumination light which has passed through the developed film with a mirror;

(e) focusing the reflected illumination light through a taking lens onto an image sensor and providing image signals in accordance with the focused reflected illumination light; and (f) arranging the mirror, the taking lens and the image sensor between the film cartridge and the film winding housing and separated away from the developed film, in a direction perpendicular to a conveying direction of the developed film, by a distance not greater than a diameter of the film cartridge and the film winding housing.

8. The method of imaging developed film of claim 7, wherein said step (d) comprises reflecting the illumination light which has passed through the developed film substantially parallel to the conveying direction.

9. A method of imaging developed film, the developed film having a base with an emulsion surface thereon and being wound in a film cartridge, the method of imaging comprising the steps of:

(a) conveying a roll of the developed film out of the film cartridge;

(b) winding the developed film conveyed out of the film cartridge in said step (b) into a film winding housing;

(c) illuminating the developed film between the film cartridge and the film winding housing with illumination light so that the illumination light passes sequentially through the base first and then through the emulsion surface;

(d) reflecting the illumination light which has passed through the emulsion surface of the developed film with a mirror;

(e) focusing the reflected illumination light through a taking lens onto an image sensor and providing image signals in accordance with the focused illumination light, and (f) arranging the mirror, the taking lens and the image sensor between the film cartridge and the film winding housing and separated away from the developed film, in a direction perpendicular to a conveying direction of the developed film, by a distance not greater than a diameter of the film cartridge and the film winding housing.

10. The method of imaging developed film of claim 9, wherein said step (d) comprises reflecting the illumination light which has passed through the emulsion surface substantially parallel to the conveying direction.

\* \* \* \* \*